United States Patent
Koravadi et al.

(10) Patent No.: US 10,855,953 B2
(45) Date of Patent: *Dec. 1, 2020

(54) VEHICULAR CONTROL SYSTEM WITH FORWARD VIEWING CAMERA AND BEAM EMITTING ANTENNA ARRAY

(71) Applicant: MAGNA ELECTRONICS INC., Auburn Hills, MI (US)

(72) Inventors: Krishna Koravadi, Rochester Hills, MI (US); Ove J. Salomonsson, Farmington Hills, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/571,644

(22) Filed: Sep. 16, 2019

(65) Prior Publication Data

US 2020/0014884 A1    Jan. 9, 2020

Related U.S. Application Data

(63) Continuation of application No. 15/189,326, filed on Jun. 22, 2016, now Pat. No. 10,419,723.

(60) Provisional application No. 62/184,546, filed on Jun. 25, 2015.

(51) Int. Cl.
*H04B 7/06* (2006.01)
*H04W 4/80* (2018.01)
*H04N 7/18* (2006.01)

(52) U.S. Cl.
CPC ............ *H04N 7/18* (2013.01); *H04B 7/0617* (2013.01); *H04N 7/183* (2013.01); *H04W 4/80* (2018.02)

(58) Field of Classification Search
CPC ........ H04B 7/0617; H04N 7/183; H04W 4/80
See application file for complete search history.

(56) References Cited

U.S. PATENT DOCUMENTS

| | | | |
|---|---|---|---|
| 5,550,677 A | 8/1996 | Schofield et al. | |
| 5,670,935 A | 9/1997 | Schofield et al. | |
| 5,854,609 A * | 12/1998 | Pyo ................. | G01S 3/325 342/359 |
| 5,949,331 A | 9/1999 | Schofield et al. | |
| 6,434,472 B1 | 8/2002 | Minowa et al. | |

(Continued)

FOREIGN PATENT DOCUMENTS

| | | |
|---|---|---|
| WO | 2011090484 A1 | 7/2011 |
| WO | 2018007995 A1 | 1/2018 |

*Primary Examiner* — Brian P Yenke
(74) *Attorney, Agent, or Firm* — Honigman LLP

(57) ABSTRACT

A vehicular control system includes an antenna array disposed at a vehicle. The antenna array emits a beam external the vehicle. A forward viewing camera is disposed at a windshield of the vehicle and views forward of the vehicle through the windshield. A control includes an image processor operable to process image data captured by the camera. The control, responsive at least in part to processing by the image processor of image data captured by the camera, determines a weather condition and/or a driving condition at the vehicle. The control may adjust the beam emitted by the antenna array responsive to determination of the weather condition and/or driving condition at the vehicle. The control may adjust power of the beam and/or a beam pattern of the beam responsive to determination of the weather condition and/or driving condition at the vehicle.

31 Claims, 7 Drawing Sheets

(56) References Cited

U.S. PATENT DOCUMENTS

| | | |
|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,156,796 B2 | 1/2007 | Makley |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,446,650 B2 * | 11/2008 | Scholfield ................ B60R 1/06 340/438 |
| 7,579,939 B2 * | 8/2009 | Schofield ................ B60Q 1/22 340/425.5 |
| 7,579,940 B2 * | 8/2009 | Schofield ................ B60C 23/00 340/425.5 |
| 7,580,795 B2 | 8/2009 | McCarthy et al. |
| 7,583,184 B2 * | 9/2009 | Schofield ................ B60K 37/06 340/438 |
| 7,616,781 B2 * | 11/2009 | Schofield ................ B60Q 1/08 382/104 |
| 7,792,329 B2 * | 9/2010 | Schofield ................ G06T 7/20 382/104 |
| 7,873,187 B2 * | 1/2011 | Schofield ................ G08G 1/167 382/104 |
| 7,949,152 B2 * | 5/2011 | Schofield ................ B60W 30/143 382/104 |
| 8,013,780 B2 | 9/2011 | Lynam |
| 8,027,029 B2 | 9/2011 | Lu et al. |
| 8,044,776 B2 * | 10/2011 | Schofield ................ B60C 23/0408 340/425.5 |
| 8,427,288 B2 * | 4/2013 | Schofield ................ B60K 37/06 340/425.5 |
| 8,643,724 B2 * | 2/2014 | Schofield ................ B60R 1/00 348/148 |
| 8,676,483 B2 | 3/2014 | Miura |
| 8,830,087 B2 | 9/2014 | Tijink et al. |
| 9,008,369 B2 * | 4/2015 | Schofield ................ H04N 7/183 382/104 |
| 9,036,026 B2 | 5/2015 | Dellantoni et al. |
| 9,070,973 B2 | 6/2015 | Hanisch et al. |
| 9,146,898 B2 | 9/2015 | Ihlenburg et al. |
| 9,214,086 B1 | 12/2015 | Onishi |
| 9,233,645 B2 * | 1/2016 | Schofield ................ G02B 27/0101 |
| 9,321,449 B2 | 4/2016 | Johansson et al. |
| 9,428,192 B2 * | 8/2016 | Schofield ................ H04N 5/2253 |
| 9,494,093 B2 | 11/2016 | Crombez et al. |
| 9,499,139 B2 | 11/2016 | Koravadi |
| 9,529,360 B1 * | 12/2016 | Melamed ................ G01S 3/46 |
| 9,575,160 B1 | 2/2017 | Davis et al. |
| 9,599,702 B1 | 3/2017 | Bordes et al. |
| 9,609,289 B2 * | 3/2017 | Schofield ................ B60W 30/143 |
| 9,637,053 B2 * | 5/2017 | Schofield ................ B60R 11/0235 |
| 9,674,490 B2 | 6/2017 | Koravadi |
| 9,688,199 B2 | 6/2017 | Koravadi |
| 9,689,967 B1 | 6/2017 | Stark et al. |
| 9,707,896 B2 | 7/2017 | Boegel et al. |
| 9,729,636 B2 | 8/2017 | Koravadi et al. |
| 9,753,121 B1 | 9/2017 | Davis et al. |
| 9,843,777 B2 * | 12/2017 | Schofield ................ B60R 11/0247 |
| 9,881,220 B2 | 1/2018 | Koravadi |
| 9,948,904 B2 * | 4/2018 | Schofield ................ B60W 50/14 |
| 10,015,452 B1 * | 7/2018 | Schofield ................ G08G 1/166 |
| 10,059,265 B2 * | 8/2018 | Schofield ................ B60R 21/01566 |
| 10,110,860 B1 * | 10/2018 | Schofield ................ H04N 7/183 |
| 10,306,190 B1 * | 5/2019 | Schofield ................ G08G 1/167 |
| 10,419,723 B2 | 9/2019 | Koravadi et al. |
| 10,427,604 B2 * | 10/2019 | Schofield ................ B60R 1/06 |
| 10,462,426 B2 * | 10/2019 | Schofield ................ B60W 50/14 |
| 2002/0113743 A1 | 8/2002 | Judd et al. |
| 2003/0064752 A1 | 4/2003 | Adachi et al. |
| 2004/0145457 A1 * | 7/2004 | Schofield ................ B60R 1/12 340/425.5 |
| 2007/0109103 A1 | 5/2007 | Jedrey et al. |
| 2007/0109146 A1 | 5/2007 | Tengler et al. |
| 2008/0082261 A1 | 4/2008 | Tengler et al. |
| 2008/0160932 A1 | 7/2008 | Smith et al. |
| 2008/0194204 A1 | 8/2008 | Duet et al. |
| 2008/0212215 A1 * | 9/2008 | Schofield ................ B60R 11/0247 359/844 |
| 2009/0290369 A1 * | 11/2009 | Schofield ................ B60C 23/0408 362/494 |
| 2010/0033984 A1 | 2/2010 | Sugimoto |
| 2010/0045797 A1 * | 2/2010 | Schofield ................ B60W 50/14 348/148 |
| 2010/0182199 A1 | 7/2010 | Jeong |
| 2010/0245066 A1 | 9/2010 | Sarioglu et al. |
| 2010/0271274 A1 | 10/2010 | Gibson et al. |
| 2010/0312446 A1 * | 12/2010 | Schofield ................ G06K 9/00798 701/70 |
| 2011/0050489 A1 | 3/2011 | Maenpa et al. |
| 2011/0093179 A1 * | 4/2011 | Schofield ................ B60R 1/001 701/93 |
| 2012/0062743 A1 | 3/2012 | Lynam et al. |
| 2012/0062744 A1 * | 3/2012 | Schofield ................ B60S 1/0844 348/148 |
| 2012/0218412 A1 | 8/2012 | Dellantoni et al. |
| 2012/0299373 A1 | 11/2012 | Yoshida |
| 2012/0302287 A1 | 11/2012 | Wright |
| 2013/0002470 A1 | 1/2013 | Kambe et al. |
| 2013/0027218 A1 | 1/2013 | Schwarz et al. |
| 2013/0222592 A1 | 8/2013 | Gieseke |
| 2013/0229522 A1 * | 9/2013 | Schofield ................ B60Q 1/2665 348/148 |
| 2014/0105054 A1 | 4/2014 | Sægrov et al. |
| 2014/0218529 A1 | 8/2014 | Mahmoud et al. |
| 2014/0297171 A1 | 10/2014 | Minemura et al. |
| 2014/0362221 A1 * | 12/2014 | Schofield ................ H04N 7/183 348/148 |
| 2014/0375476 A1 | 12/2014 | Johnson et al. |
| 2015/0124096 A1 | 5/2015 | Koravadi |
| 2015/0131086 A1 | 5/2015 | Morishita et al. |
| 2015/0158499 A1 | 6/2015 | Koravadi |
| 2015/0251599 A1 | 9/2015 | Koravadi |
| 2015/0348412 A1 | 12/2015 | Onishi |
| 2015/0352953 A1 | 12/2015 | Koravadi |
| 2016/0036917 A1 | 2/2016 | Koravadi et al. |
| 2016/0100084 A1 * | 4/2016 | Schofield ................ B60R 1/06 348/148 |
| 2016/0210853 A1 | 7/2016 | Koravadi |
| 2016/0223651 A1 | 8/2016 | Kamo et al. |
| 2016/0267781 A1 | 9/2016 | Papay |
| 2016/0381326 A1 * | 12/2016 | Schofield ................ B60W 30/143 348/118 |
| 2016/0381571 A1 | 12/2016 | Koravadi et al. |
| 2017/0043702 A1 | 2/2017 | Park et al. |
| 2017/0066440 A1 | 3/2017 | Koravadi |
| 2017/0158133 A1 | 6/2017 | Chundrlik, Jr. et al. |
| 2017/0174471 A1 | 6/2017 | Salmikuukka et al. |
| 2017/0222311 A1 | 8/2017 | Hess et al. |
| 2017/0237946 A1 * | 8/2017 | Schofield ................ B60S 1/0822 348/148 |
| 2017/0254873 A1 | 9/2017 | Koravadi |
| 2017/0276788 A1 | 9/2017 | Wodrich |
| 2017/0285754 A1 | 10/2017 | Holman et al. |

(56) References Cited

U.S. PATENT DOCUMENTS

| | | |
|---|---|---|
| 2017/0292315 A1 | 10/2017 | Koravadi |
| 2017/0302889 A1 | 10/2017 | Koravadi |
| 2017/0315231 A1 | 11/2017 | Wodrich |
| 2017/0320440 A1 | 11/2017 | Boegel et al. |
| 2017/0334484 A1 | 11/2017 | Koravadi |
| 2017/0356994 A1 | 12/2017 | Wodrich et al. |
| 2018/0009374 A1 | 1/2018 | Kim et al. |
| 2018/0015875 A1 | 1/2018 | May et al. |
| 2018/0020192 A1* | 1/2018 | Schofield ............ G01R 31/3828 |
| 2018/0045812 A1 | 2/2018 | Hess |
| 2018/0082315 A1 | 3/2018 | Smid et al. |
| 2018/0109764 A1* | 4/2018 | Schofield ............ B60R 11/0235 |
| 2018/0113461 A1 | 4/2018 | Potnis et al. |
| 2018/0141563 A1 | 5/2018 | Becker |
| 2018/0158337 A1 | 6/2018 | Koravadi |
| 2018/0167551 A1 | 6/2018 | Koravadi |
| 2018/0217254 A1 | 8/2018 | Hong et al. |
| 2018/0217255 A1 | 8/2018 | Kim |
| 2018/0309963 A1* | 10/2018 | Schofield .............. B60W 30/18 |
| 2019/0009721 A1* | 1/2019 | Schofield ............... B60K 35/00 |
| 2019/0158790 A1* | 5/2019 | Schofield ................. B60R 1/12 |
| 2019/0273896 A1* | 9/2019 | Schofield ................. B60Q 1/08 |

* cited by examiner

LEGEND:
10 - SYSTEM
12 - CAMERA
14 - WINDSHIELD
16 - VEHICLE

VEHICULAR CONTROL SYSTEM WITH FORWARD VIEWING CAMERA AND BEAM EMITTING ANTENNA ARRAY

CROSS REFERENCE TO RELATED APPLICATIONS

The present application is a continuation of U.S. patent application Ser. No. 15/189,326, filed Jun. 22, 2016, now U.S. Pat. No. 10,419,723, which claims the filing benefits of U.S. provisional application Ser. No. 62/184,546, filed Jun. 25, 2015, which is hereby incorporated herein by reference in its entirety.

FIELD OF THE INVENTION

The present invention relates generally to a vehicle vision system for a vehicle and, more particularly, to a vehicle vision system that utilizes a forward facing camera, such as at a vehicle windshield.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

Dedicated Short Range Communication (DSRC) radio technology has been developed in recent past to enable communications-based active safety systems. The communication link for such applications needs a reliable, high speed, low latency that is immune to extreme weather conditions, works reliably in high speed mobility conditions and multipath roadway environments.

SUMMARY OF THE INVENTION

The present invention provides a communication system and vision system or imaging system for a vehicle that utilizes one or more cameras (preferably one or more CMOS cameras) to capture image data representative of images exterior of the vehicle, and provides a windshield camera having an integrated DSRC radio with multi diversified array antenna. The present invention comprises a methods and apparatus to enhance the performance of DSRC communication in the vehicle utilizing antenna diversity, dynamic beam pattern control, and dynamic transmission power control methodology utilizing the forward viewing camera.

In accordance with an aspect of the present invention, a communication system for a vehicle includes an antenna array for transmitting data to at least one other vehicle or structure. A control is operable to adjust a beam transmission of the antenna array responsive to determination of a driving condition of the vehicle. The antenna array may be disposed at a camera of the vehicle, such as at a forward viewing windshield mounted camera of the vehicle. For example, the antenna array may be integrated in a camera mounting bracket at the windshield of the vehicle. Optionally, a second antenna array may be disposed at a rearward portion of the vehicle, such as at a "shark fin" antenna element or a rear camera of the vehicle. The control may be operable to adjust a beam transmission of one of the antenna arrays independent of the beam transmission of the other of the antenna arrays. For example, the control may adjust the beam transmission of one of the antenna arrays (such as the front array) to an omnidirectional beam and to adjust the beam transmission of the other of the antenna arrays (such as the rear array) to a directional beam so as to provide enhanced transmission range of the other antenna array.

The control may adjust the beam transmission from an omnidirectional beam to a directed beam to enhance the transmission range of the beam. For example, the control may adjust the beam transmission to the directed beam directed rearward of the vehicle responsive to a determination of a highway driving condition. The control may adjust the beam transmission responsive to a determination of at least one of (i) a highway driving condition, (ii) a high traffic driving condition, (iii) an intersection driving condition and (iv) an adverse weather condition.

The antenna array is associated with a DSRC radio of the vehicle. The control may adjust a power output of the DSRC radio responsive to a driving condition. For example, the control may adjust the power output of the DSRC radio responsive to a determination of an adverse weather condition.

These and other objects, advantages, purposes and features of the present invention will become apparent upon review of the following specification in conjunction with the drawings.

LEGEND

Figure 1:
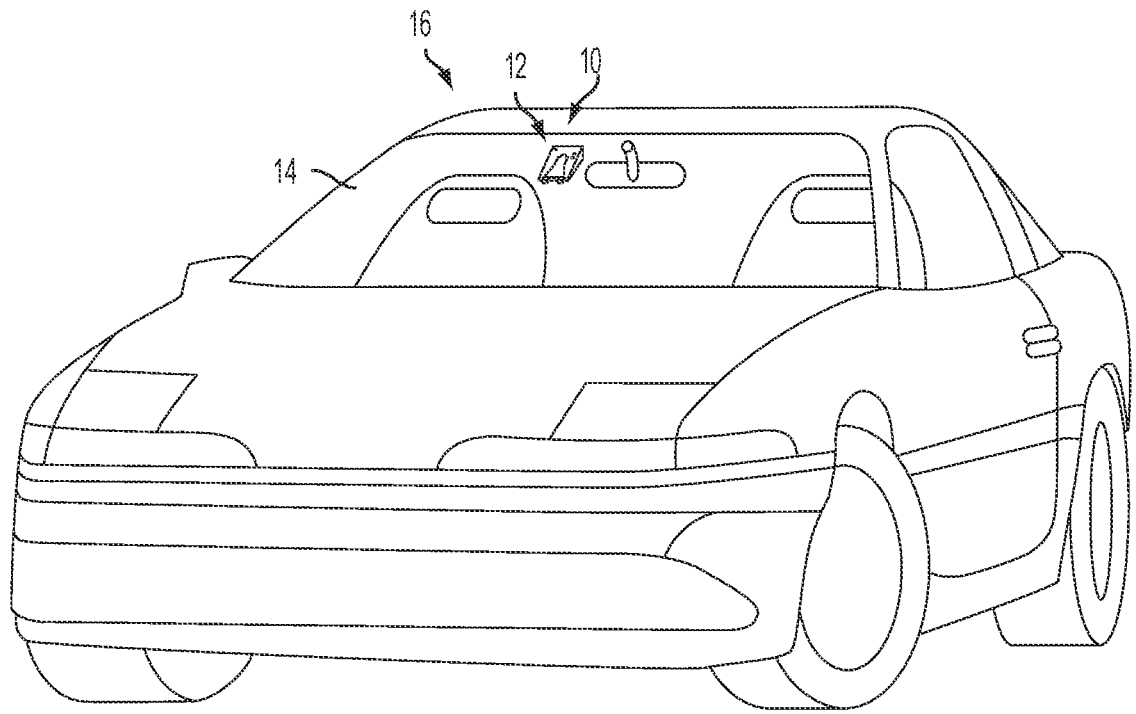
FIG. 1 is a perspective view of a vehicle with a vision system that incorporates at least a forward viewing camera in accordance with the present invention.

101 Integrated windshield camera unit with array antenna with DSRC radio components
102a DSRC array antenna in shark fin unit
102b DSRC array antenna in the rear window
103 DSRC array antenna as an integral part of the windshield camera unit
104 Main processor process the video and V2X data
105 Image processor process the video data
106 Windshield camera lens and imager
107 DSRC RF frontend and MAC (Media Access Control)
108 Antenna cable for the shark fin antenna array or rear windshield antenna array
109 Shark fin/rear windshield antenna array omnidirectional beam pattern
110 Windshield array antenna omnidirectional beam pattern
111 Directional beam pattern of shark fin/rear windshield antenna
112, 113 Omnidirectional beam pattern
114 Windshield camera mounting bracket
115 Mounting bracket integrated with array antennas
116 Camera mounting flange
117 Antenna connector
118 Antenna connector part of windshield camera
119 Windshield camera lens

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in the predicted path of the vehicle. The vision system includes an image processor or image processing system that is operable to receive image data from one or more cameras and to process the captured image data.

Referring now to the drawings and the illustrative embodiments depicted therein, a vehicle imaging system or vision system 10 includes at least one exterior facing imaging sensor or camera, such as a forward facing imaging sensor or camera 12 disposed at the windshield 14 of the vehicle 16 and viewing forwardly through the windshield of the vehicle, with the camera having a lens for focusing images at or onto an imaging array or imaging plane or imager of the camera (FIG. 1). The forward viewing camera is disposed at the windshield of the vehicle and views through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor that is operable to process image data captured by the camera or cameras and may detect objects or the like. The data transfer or signal communication from the camera to the ECU may comprise any suitable data or communication link, such as a vehicle network bus or the like of the equipped vehicle.

DSRC radio performance is sensitive to the location of the antenna, and utilizing the antenna diversity techniques a high reliable signal reception in multipath environments can be achieved. Mounting the antenna on the roof or front of the vehicle detracts from the appearance of the vehicle. The present invention provides an elegant look while also providing a reliable signal reception.

The range of the DSRC communication link may be degraded as the snow or rain water density increases. For safety critical applications it is very important to have good range during such bad weather conditions. The range may be improved if the system is aware of such situations and the transmission power of the radio is dynamically controlled during such situations.

It is important to have better range toward the rear and rearward of the vehicle especially during highway driving, such that the following vehicles will be aware of the accident or environment condition in advance and limit or prevent multi vehicle pileup accidents. Thus, the present invention may dynamically control the antenna beam depending on the driving situation to provide enhanced range for the given transmission power.

Figure 4:
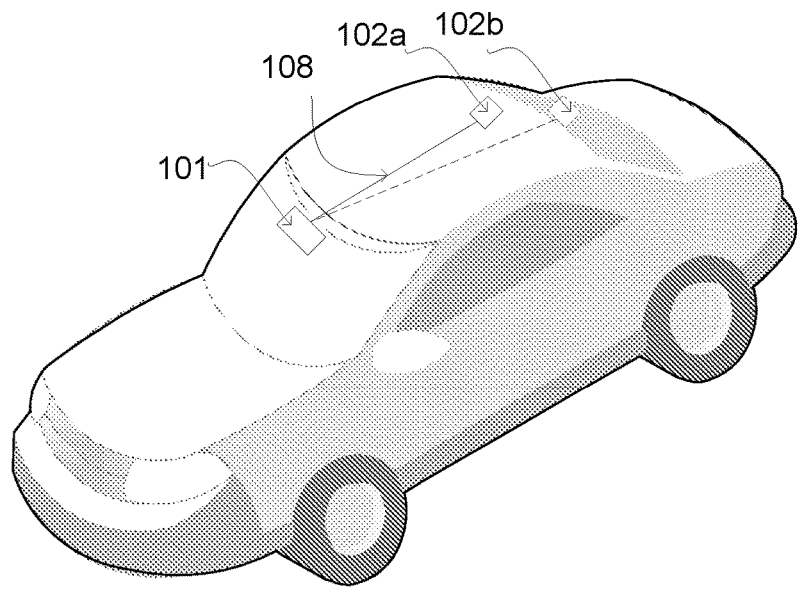
FIG. 4 is a layout of windshield camera and shark fin antenna in the vehicle in accordance with the present invention.

The performance of the DSRC radio may be improved by utilizing multiple antennas installed at various selected diversified locations at the vehicle. A windshield camera 119 is located at the windshield, and one array antenna 115 may be an integral part of the camera mounting bracket 114 (such as shown in FIG. 2) of the camera module 101 and another array antenna may be an integral part of the shark fin antenna unit 102a or a rear window camera 102b (such as shown in FIG. 4).

Figure 6:
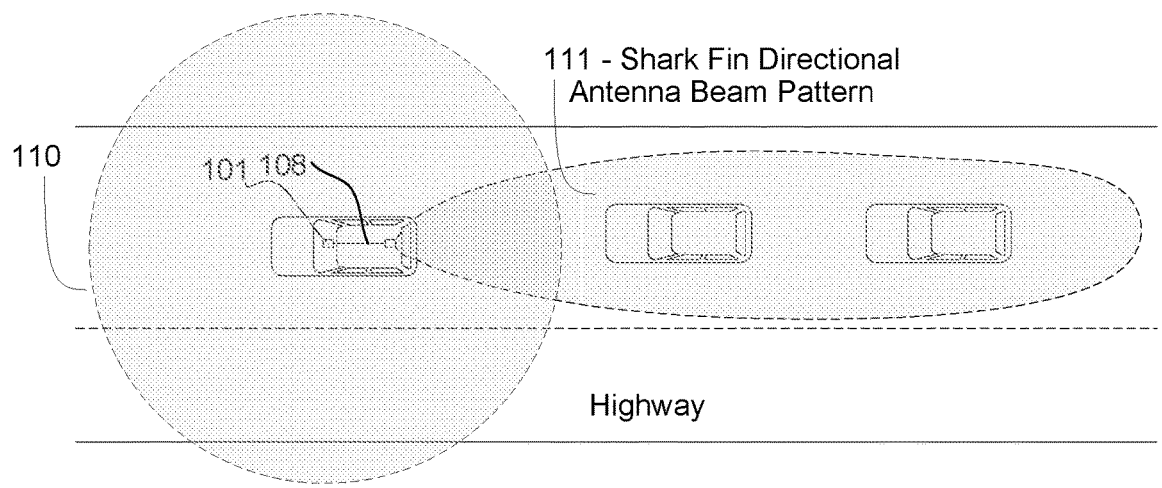
FIG. 6 is a plan view of a vehicle, showing an antenna beam pattern for a highway driving scenario where the array antenna in the shark fin/rear window is used as a directional beam directed rearward and the windshield camera array antenna used as omnidirectional pattern in accordance with the present invention.

As the range of the DSRC link may be improved by controlling the antenna beam, during the highway driving as the traffic flow in one direction, a concentrated beam 111 could be formed rearward of the vehicle, such as shown in FIG. 6, utilizing the antenna array to improve the communication link performance (provides longer range with focused beam formation) to mitigate multi vehicle pileup accidents. Highway driving location is detected by the windshield camera and the shark fin/rear window antenna array is controlled in a method to form a beam concentrating rearwards and the windshield antenna array is controlled to form omnidirectional pattern to communicate surrounding vehicles and the vehicles entering the highway. During dense city traffic and intersection conditions, it is better to have an omnidirectional pattern 110 (FIG. 6) or 112, 113 (FIG. 7) to cover larger surroundings, and similar patterns will be better for the parking lot situation as well, such as shown in FIG. 8. Such dynamic beam pattern control provides tailoring of the antenna transmission beam or beams to enhance communication during various driving conditions.

Figure 10:
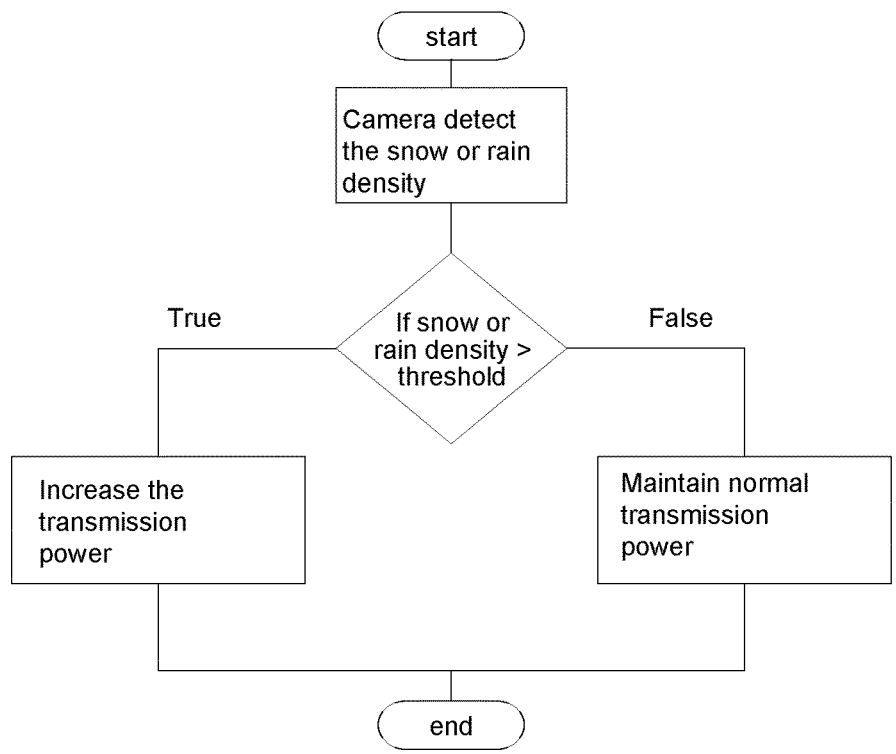
FIG. 10 is a flow chart of the dynamic antenna transmission power control depending on the density of the snow and rain detected by camera and traffic density in accordance with the present invention.

As the DSRC radio performance degrades such as due to bad weather conditions like snow, rain, fog and/or the like, the system of the present invention may sense the weather condition (such as by utilizing the windshield camera and processing image data captured by the windshield camera) and, responsive to a determination of bad weather conditions that may adversely affect or degrade the radio performance, the transmission power of the DSRC radio may be dynamically adjusted to improve the range during such bad weather conditions, such as shown in the flowchart of FIG. 10. Such dynamic transmission power control provides tailoring of the power of the signal or radio performance to enhance communication during various driving conditions.

Figure 2:
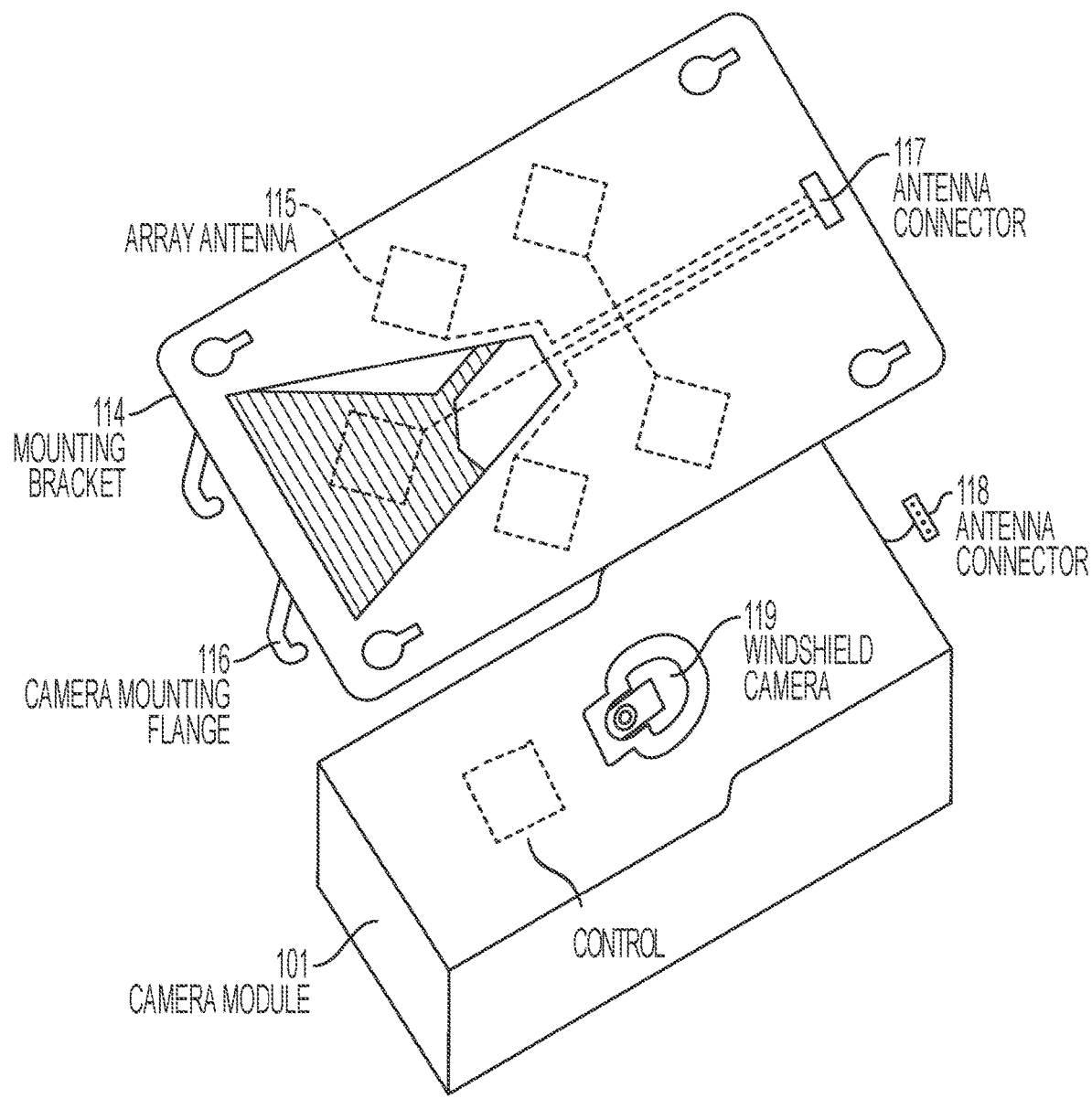
FIG. 2 is an exploded perspective view of a windshield camera unit with array antennas integrated into the mounting bracket in accordance with the present invention.

FIG. 2 is an illustration of an array antenna 115 design as an integral part of the front windshield camera mounting bracket 114, and thus utilizes the prime location of the windshield and provides antenna diversity to the communication system. The array antenna 115 is connected to the camera module utilizing the connector 117 and 118.

Figure 3:
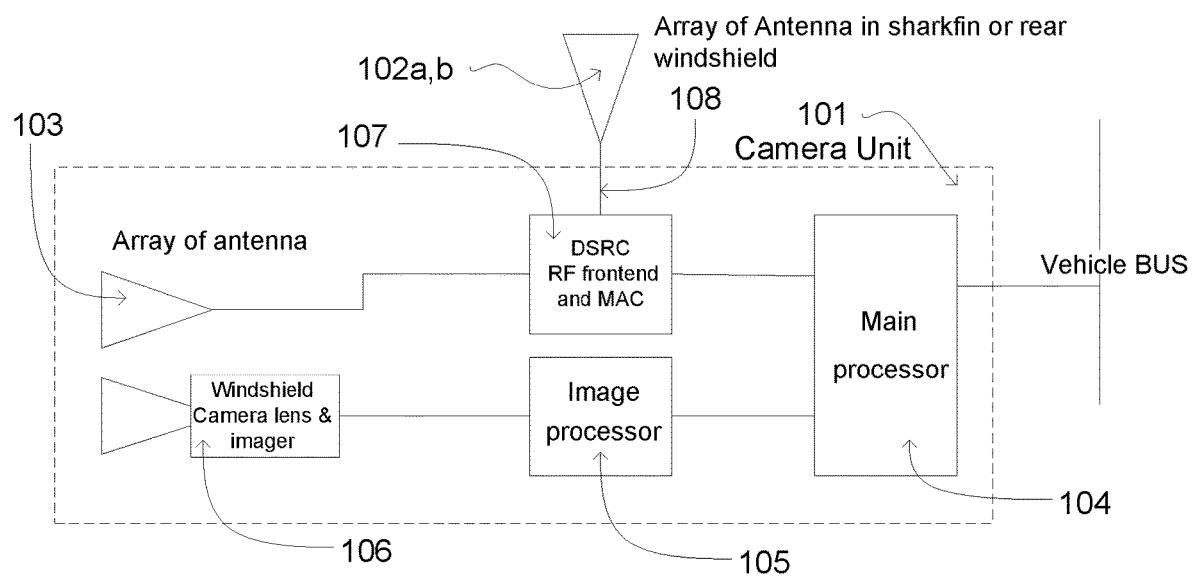
FIG. 3 is a block diagram of windshield camera with a DSRC radio and an integrated antenna array of the present invention.

FIG. 3 is a block diagram of the windshield camera module with multi antenna DSRC radio integrated modules, comprising a windshield lens module 106 connected to the image processor 105 capable of detecting the objects, weather conditions, and driving environments (such as highway, city road, parking lot and the like). The DSRC physical layer and MAC 107 is interfaced with the main processor 104. The main processor 104 process vehicle to infrastructure (V2X) communication data and video data and also controls the DSRC radio.

Such vehicle communication systems may provide for communication between vehicles and/or between a vehicle and a remote server. Such car2car or vehicle to vehicle (V2V) and vehicle to infrastructure (car2X or V2X or V2I) technology provides for communication between vehicles and/or infrastructure based on information provided by one or more vehicles and/or information provided by a remote server or the like. The vehicle communication systems may utilize aspects of the systems described in U.S. Pat. Nos. 6,690,268; 6,693,517; 7,156,796 and/or 7,580,795, and/or U.S. Publication Nos. US-2012-0218412, US-2012-0062743, US-2015-0158499: US-2015-0124096 and/or US-2015-0352953, which are all hereby incorporated herein by reference in their entireties.

The main processor may also interface with other modules of the vehicle via a vehicle communication network or bus. The DSRC radio comprises two array antenna modules 103 and 102 for antenna diversity, with one array antenna located in the camera mounting bracket 114 (such as shown in FIG. 2) and the other array antenna located in the shark fin module 102a or rear window 102b (such as shown in FIG. 4).

Figure 5:
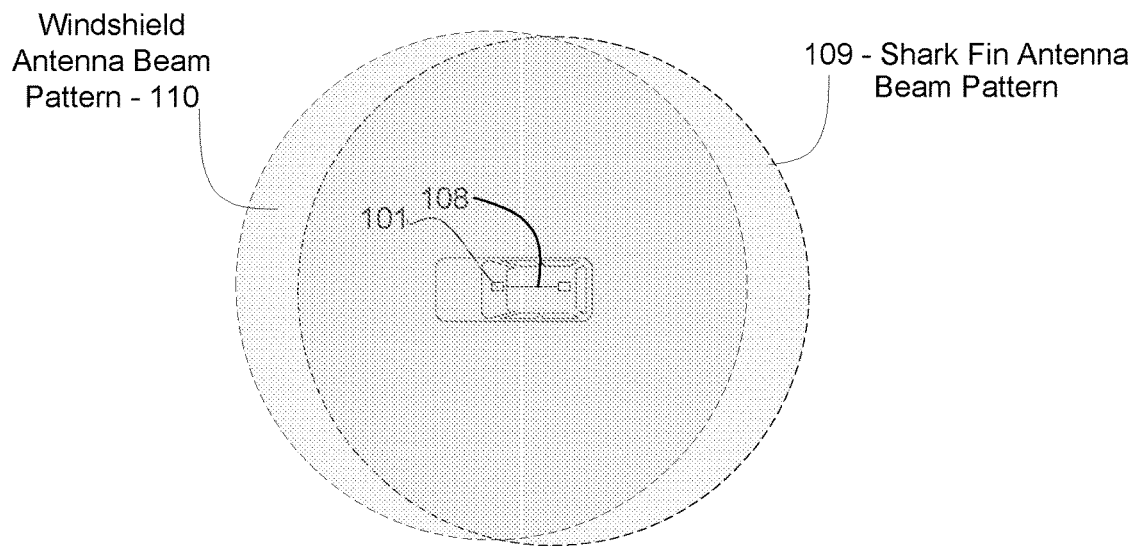
FIG. 5 is a plan view of a vehicle, showing an omnidirectional beam pattern for both the antenna array in the windshield camera and shark fin or rear window.
Figure 7:
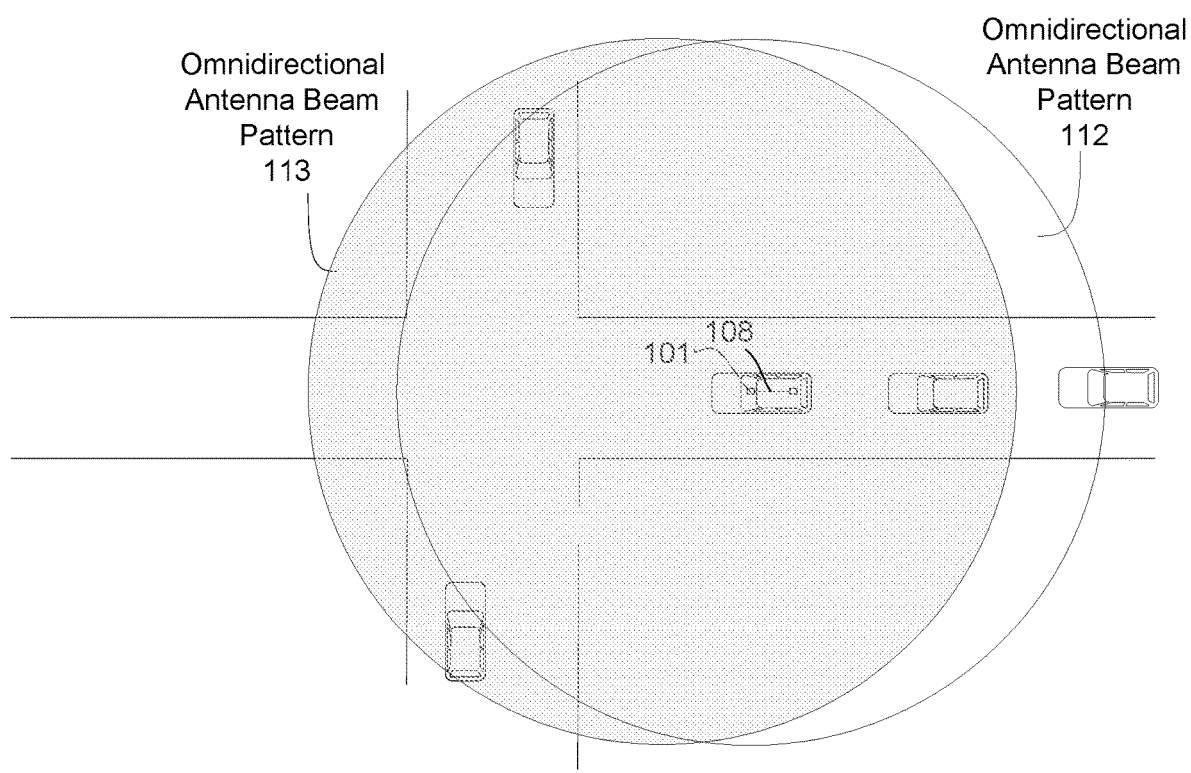
FIG. 7 is a plan view of a vehicle, showing an antenna beam pattern for a city driving situation where the vehicle is approaching an intersection and where the array antenna in shark fin/rear window is used as a directional beam directed rearward and the windshield camera array antenna is used as omnidirectional pattern in accordance with the present invention.
Figure 8:
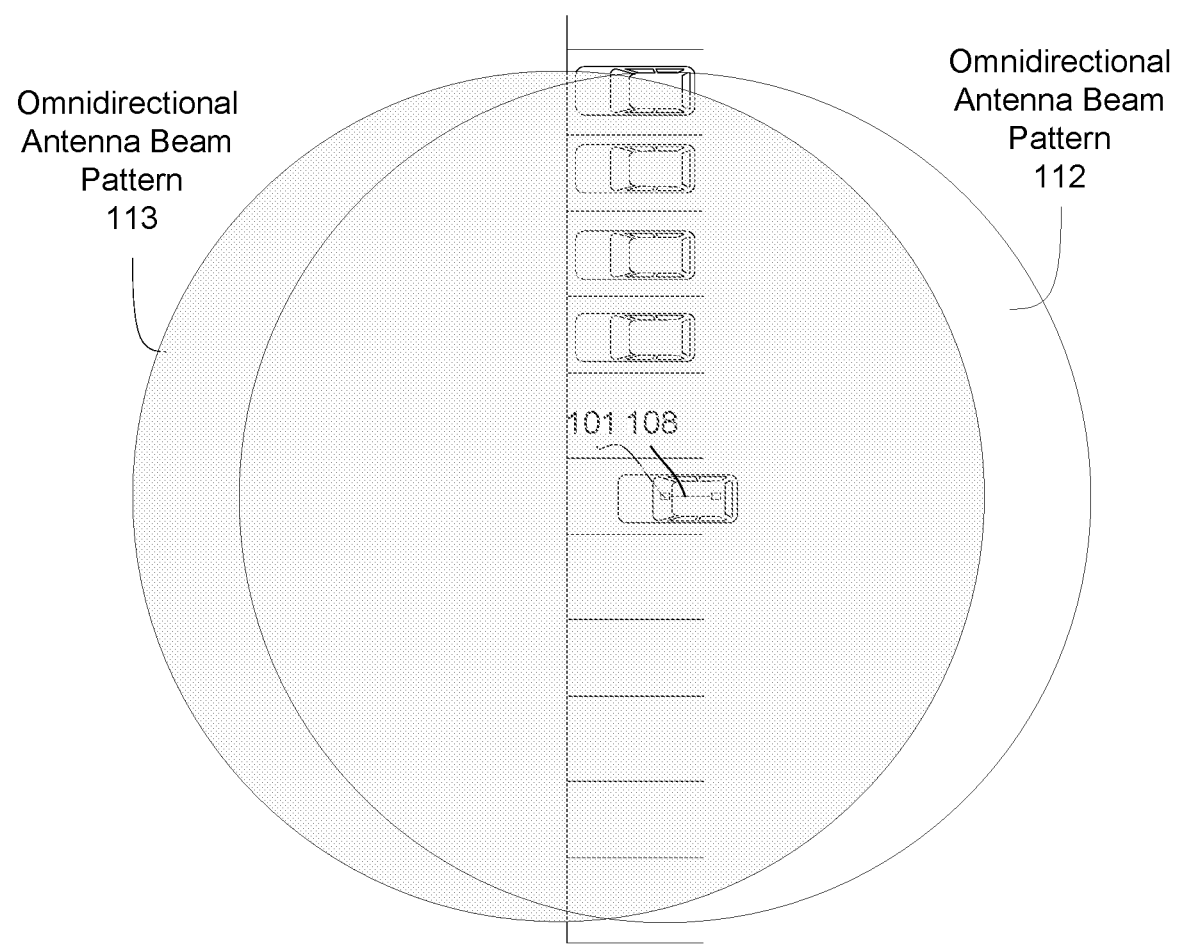
FIG. 8 is a plan view of a vehicle, showing an antenna beam pattern for a parking lot driving situation where the array antenna in the shark fin/rear window and the windshield camera array antenna are used as an omnidirectional pattern in accordance with the present invention.

FIG. 5 is an omnidirectional beam pattern from the front windshield antenna and the shark fin/rear window antenna, such as may be used in parking lot situations (FIG. 8) and high density and/or intersection city driving scenarios (FIG. 7).

FIG. 6 is an illustration of dynamic beam shaping 111 generated utilizing the antenna array 102a/102b, where the rear antenna array has a rearward directed beam 111 and the front antenna array has an omnidirectional beam pattern 101.

Figure 9:
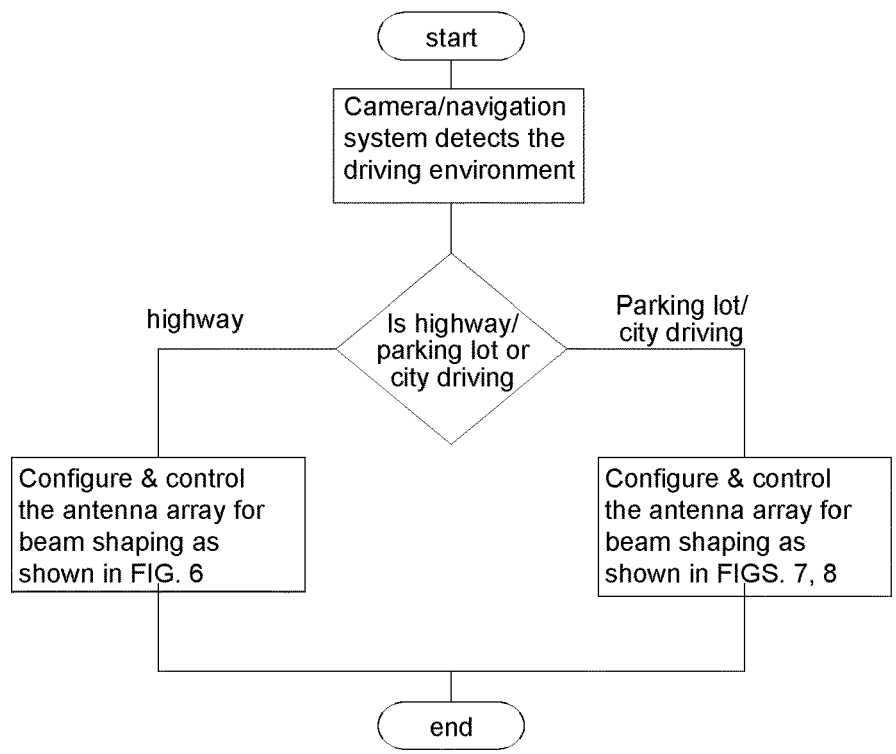
FIG. 9 is a flow chart of the dynamic antenna transmission beam control using the camera data in accordance with the present invention.

FIG. 9 is an illustration of dynamic beam shaping flowchart that utilizes the camera data or camera data fused with navigation system information from a vehicle data bus to control the beam shaping of the antennas to enhance the range.

FIG. 10 is an illustration of dynamic transmission power control flowchart that utilizes the camera data or camera data fused with the weather data available from weather service information, such as from a vehicle data bus, and may control or adjust or change the transmission power of the radios to enhance or increase the range during the determined bad weather conditions.

Therefore, the present invention provides a control or system that adjusts the beam of an antenna array responsive to detection of a driving condition, such as weather conditions at or surrounding the vehicle, highway driving conditions, intersection driving conditions, high or low traffic conditions, parking conditions and/or the like. The driving condition or conditions may be determined via any suitable means, such as responsive to a communication received from a GPS system of the vehicle or a vehicle to infrastructure (V2X) system or such as responsive to processing by an image processor of image data captured by one or more cameras of the vehicle, such as the windshield-mounted camera or such as one or more other exterior viewing cameras of the vehicle (such as a forward viewing front-mounted camera and/or sideward viewing side-mounted cameras and/or a rearward viewing rear-mounted camera of the vehicle that operate as part of a multi-camera surround view vision system of the vehicle).

The system may utilize an omnidirectional beam that covers a generally circular area around the vehicle, and when it is desired to extend the beam further in one direction (such as rearward of the vehicle during highway driving conditions), the system adjusts or controls the beam to provide a directed beam (such as a rearward directed beam) that has an enhanced range in the directed direction as compared to the omnidirectional beam. The system of the present invention thus provides dynamic control or shaping of the antenna beam and range and direction responsive to determined driving conditions at or around the vehicle. Optionally, the system or control may control or dynamically adjust the transmission power of the DSRC radio to improve the range during determined driving conditions, such bad weather conditions, when the transmission power may be degraded.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EYEQ2 or EYEQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a traffic sign recognition system, a system for determining a distance to a leading vehicle or object, such as a system utilizing the principles disclosed in U.S. Pat. Nos. 6,396,397 and/or 7,123,168, which are hereby incorporated herein by reference in their entireties, and/or the like.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties. Optionally, for example, the system may include multiple exterior facing imaging sensors or cameras, such as a forwardly facing camera at the front of the vehicle, and a sidewardly/rearwardly facing camera at respective sides of the vehicle), which capture images exterior of the vehicle.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, said vehicular control system comprising:

an antenna array disposed at a vehicle equipped with said vehicular control system, wherein said antenna array emits a beam external the equipped vehicle;

a forward viewing camera disposed at a windshield of the vehicle and viewing forward of the vehicle through the windshield, wherein said camera is operable to capture image data;

a control comprising an image processor operable to process image data captured by said camera;

wherein said control, responsive at least in part to processing by said image processor of image data captured by said camera, determines a weather condition at the equipped vehicle; and wherein said control adjusts the beam emitted by said antenna array responsive to determination of the weather condition at the equipped vehicle.

2. The vehicular control system of claim 1, wherein said control adjusts a beam pattern of the beam emitted by said antenna array responsive to determination of the weather condition at the equipped vehicle.

3. The vehicular control system of claim 2, wherein said control adjusts the beam pattern of the beam emitted by said antenna array between an omnidirectional beam and a directed beam.

4. The vehicular control system of claim 2, wherein said control adjusts the beam emitted by said antenna array from an omnidirectional beam to a directed beam to enhance range of the beam emitted by said antenna array.

5. The vehicular control system of claim 2, wherein, responsive to determination of the weather condition at the equipped vehicle, said control dynamically adjusts the beam pattern of the beam emitted by said antenna array to enhance the beam emitted by said antenna array during an adverse weather condition.

6. The vehicular control system of claim 1, wherein said control adjusts power of the beam emitted by said antenna array responsive to determination of the weather condition at the equipped vehicle.

7. The vehicular control system of claim 6, wherein, responsive at least in part to determination of the weather condition at the vehicle, said control increases power of the beam emitted by said antenna array to increase range of the beam emitted by said antenna array.

8. The vehicular control system of claim 1, wherein said control adjusts the beam emitted by said antenna array responsive to determination of snow at the equipped vehicle.

9. The vehicular control system of claim 1, wherein, responsive to determination of the weather condition at the equipped vehicle, said control dynamically adjusts power of the beam emitted by said antenna array to enhance the beam emitted by said antenna array during an adverse weather condition.

10. The vehicular control system of claim 1, wherein said control determines the weather condition at the equipped vehicle in part responsive to weather data received from a weather service external of the vehicle.

11. The vehicular control system of claim 1, wherein said control adjusts the beam emitted by said antenna array responsive to a determined driving condition selected from the group consisting of (i) a highway driving condition, (ii) a traffic condition and (iii) an intersection condition.

12. The vehicular control system of claim 11, wherein said control adjusts a beam pattern of the beam emitted by said antenna array from an omnidirectional beam to a directed beam responsive to determination of a highway driving condition.

13. The vehicular control system of claim 11, wherein said control adjusts a beam pattern of the beam emitted by said antenna array from a directed beam to an omnidirectional beam responsive to determination of an intersection condition.

14. The vehicular control system of claim 1, comprising two antenna arrays disposed at the equipped vehicle.

15. The vehicular control system of claim 14, wherein said control is operable to adjust the beam emitted by one of said antenna arrays independent of the beam emitted by the other of said antenna arrays.

16. The vehicular control system of claim 14, wherein said control is operable to adjust a beam pattern of the beam emitted by one of said antenna arrays from a directional beam to an omnidirectional beam and to adjust a beam pattern of the beam emitted by the other of said antenna arrays from an omnidirectional beam to a directional beam.

17. A vehicular control system, said vehicular control system comprising:

an antenna array disposed at a vehicle equipped with said vehicular control system, wherein said antenna array emits a beam external the equipped vehicle;

a forward viewing camera disposed at a windshield of the vehicle and viewing forward of the vehicle through the windshield, wherein said camera is operable to capture image data;

a control comprising an image processor operable to process image data captured by said camera;

wherein said control, responsive at least in part to processing by said image processor of image data captured by said camera, determines a weather condition at the equipped vehicle;

wherein said control adjusts power of the beam emitted by said antenna array responsive to determination of the weather condition at the equipped vehicle; and wherein, responsive to determination of snow at the vehicle, said control adjusts power of the beam emitted by said antenna array.

18. The vehicular control system of claim 17, wherein said control adjusts a beam pattern of the beam emitted by said antenna array responsive to determination of the weather condition at the equipped vehicle.

19. The vehicular control system of claim 17, wherein said control determines the weather condition at the equipped vehicle in part responsive to weather data received from a weather service external of the vehicle.

20. The vehicular control system of claim 17, wherein said control adjusts the beam emitted by said antenna array responsive to a determined driving condition selected from the group consisting of (i) a highway driving condition, (ii) a traffic condition and (iii) an intersection condition.

21. The vehicular control system of claim 17, comprising two antenna arrays disposed at the equipped vehicle, wherein said control is operable to adjust the beam emitted by one of said antenna arrays independent of the beam emitted by the other of said antenna arrays.

22. The vehicular control system of claim 17, wherein, responsive to determination of increasing snow at the vehicle, said control increases power of the beam emitted by said antenna array.

23. A vehicular control system, said vehicular control system comprising:

an antenna array disposed at a vehicle equipped with said vehicular control system, wherein said antenna array emits a beam external the equipped vehicle;

a forward viewing camera disposed at a windshield of the vehicle and viewing forward of the vehicle through the windshield, wherein said camera is operable to capture image data;

a control comprising an image processor operable to process image data captured by said camera;

wherein said control is operable to adjust a beam pattern of the beam emitted by said antenna array; and wherein said control adjusts the beam pattern of the beam emitted by said antenna array responsive to determination of a driving condition selected from the group consisting of (i) a highway driving condition, (ii) a traffic condition and (iii) an intersection condition.

24. The vehicular control system of claim 23, wherein said control is operable to adjust the beam pattern of the beam emitted by said antenna array between an omnidirectional beam and a directed beam.

25. The vehicular control system of claim 23, wherein said control, responsive at least in part to processing by said image processor of image data captured by said camera, determines a weather condition at the equipped vehicle, and wherein said control adjusts the beam pattern of the beam emitted by said antenna array responsive to determination of the weather condition at the equipped vehicle.

26. The vehicular control system of claim 25, wherein said control determines the weather condition at the equipped vehicle in part responsive to weather data received from a weather service external of the vehicle.

27. The vehicular control system of claim 25, wherein, responsive to determination of the weather condition at the equipped vehicle, said control adjusts the beam pattern of the beam emitted by said antenna array between an omnidirectional beam and a directed beam.

28. The vehicular control system of claim 25, wherein said control, responsive at least in part to processing by said image processor of image data captured by said camera, determines a weather condition at the equipped vehicle, and wherein said control adjusts power of the beam emitted by said antenna array responsive to determination of the weather condition at the equipped vehicle.

29. The vehicular control system of claim 23, wherein said control adjusts the beam pattern of the beam emitted by said antenna array from an omnidirectional beam to a directed beam responsive to determination of a highway driving condition.

30. The vehicular control system of claim 23, wherein said control adjusts the beam pattern of the beam emitted by said antenna array from a directed beam to an omnidirectional beam responsive to determination of an intersection condition.

31. The vehicular control system of claim 23, comprising two antenna arrays disposed at the equipped vehicle, and wherein said control is operable to adjust the beam pattern of the beam emitted by one of said antenna arrays from a directional beam to an omnidirectional beam and to adjust the beam pattern of the beam emitted by the other of said antenna arrays from an omnidirectional beam to a directional beam.

* * * * *